March 27, 1951

L. C. WHITON ET AL 2,546,246

APPARATUS FOR CENTRIFUGALLY SEPARATING
SUSPENDED PARTICLES FROM GASES

Filed June 10, 1947

INVENTORS
LOUIS C. WHITON
JOHN E. WATSON
BY CHARLES B. McBRIDE
FRANKLIN REMINGTON

Benj. T. Rauber
ATTORNEY

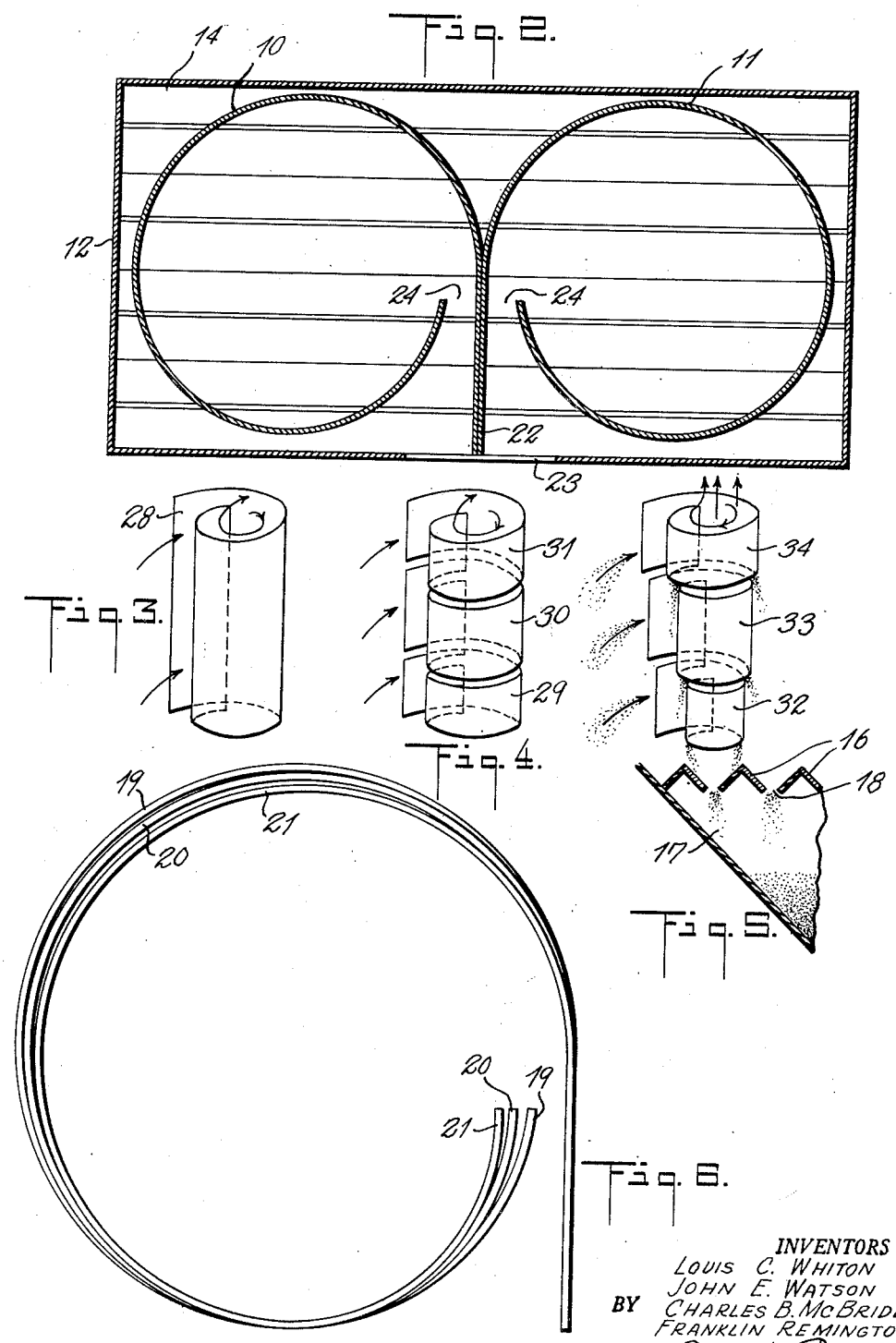

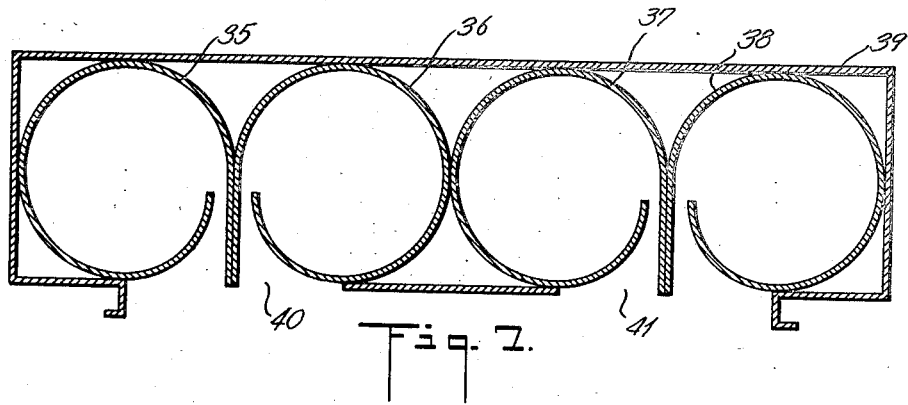
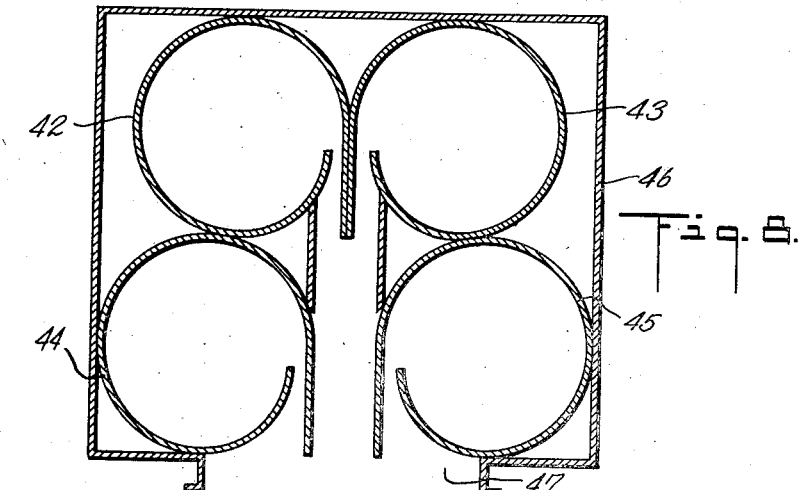
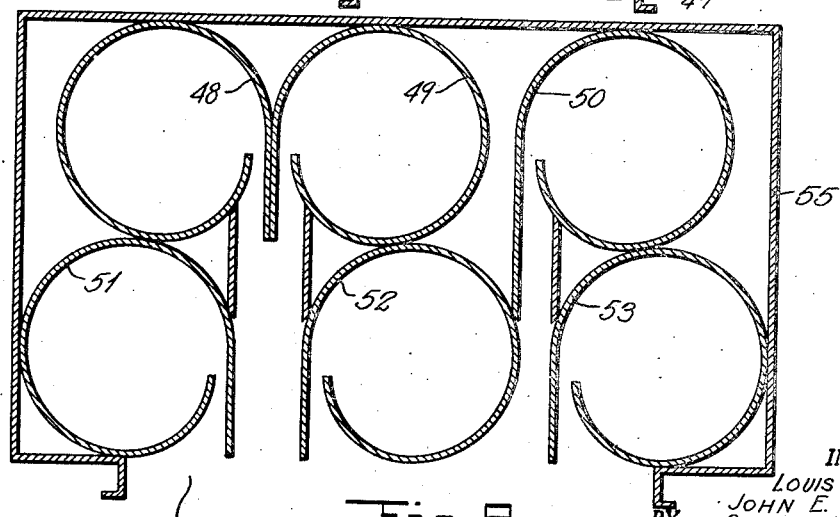

Patented Mar. 27, 1951

2,546,246

UNITED STATES PATENT OFFICE 2,546,246

APPARATUS FOR CENTRIFUGALLY SEPARATING SUSPENDED PARTICLES FROM GASES

Louis C. Whiton and John E. Watson, Westport, Conn., and Charles B. McBride, Port Chester, and Franklin Remington, Oyster Bay, N. Y., assignors to Prat-Daniel Corporation, East Portchester, Conn., a corporation of New York Application June 10, 1947, Serial No. 753,670

8 Claims. (Cl. 183—83)

Our invention relates to apparatus for centrifugally separating suspended particles from air or other gases.

Heretofore in centrifugal separators the air carrying the suspended particles has been caused to flow in a spiral path downwardly in such a manner as to throw the particles outwardly against the inner surface of the container and thence to flow upwardly through an off-take pipe or opening. The separation of the particles from the air or gas in this type of apparatus took place upon the reversal of the direction of flow of the gas. Apparatus of this type involved a considerable drop in pressure in order to obtain the required gas velocity thereby resulting in a draft loss. Also for efficient operation the apparatus had to be made to close dimensions and was correspondingly expensive.

In our present invention we provide a centrifugal separating apparatus of simple and inexpensive construction and one in which only a small draft loss is involved.

In our present invention the dust laden air or gas passes into a scroll which may be a sheet of metal bent to scroll form of somewhat more than one revolution. A number of such scrolls of different diameters may be arranged edge to edge and slightly spaced. The upper end of the scroll or of the uppermost scroll opens into an off-take chamber for the gases, while the lower end of the lowermost section opens downwardly into a dust collecting bin.

The scrolls may be placed in a plenum chamber to which the dust laden air is supplied and into which the separated dust may be projected through the spaces between the superposed scroll sections, or may fall downwardly directly into the dust bin. The air or dust laden gas entering the scroll therefore passes in a generally upward spiral without reversal of direction and with a minimum draft loss. The scrolls being made merely of bent or curved strips of metal are relatively inexpensive to construct. Several of the scrolls may be assembled in a single plenum chamber and may deliver the separated particles to a hopper below this chamber between appropriate baffles which oppose any tendency for air to circulate in the hopper.

The various features of our invention are illustrated, by way of example, in the accompanying drawings in which—

Fig. 2 is a horizontal section of the apparatus of Fig. 1 taken on the line 2—2;

Figs. 3 and 4 are perspective views of scrolls that may be used in the apparatus;

Fig. 5 is a similar view of the arrangement of another modification of scroll and dust collecting bin;

Fig. 6 is a plan or end view of a scroll made of three sections of different or graduated diameters;

Figs. 7, 8 and 9 are diagrammatic horizontal sections of apparatus showing different arrangements for multiple scroll separators.

Figure 1:
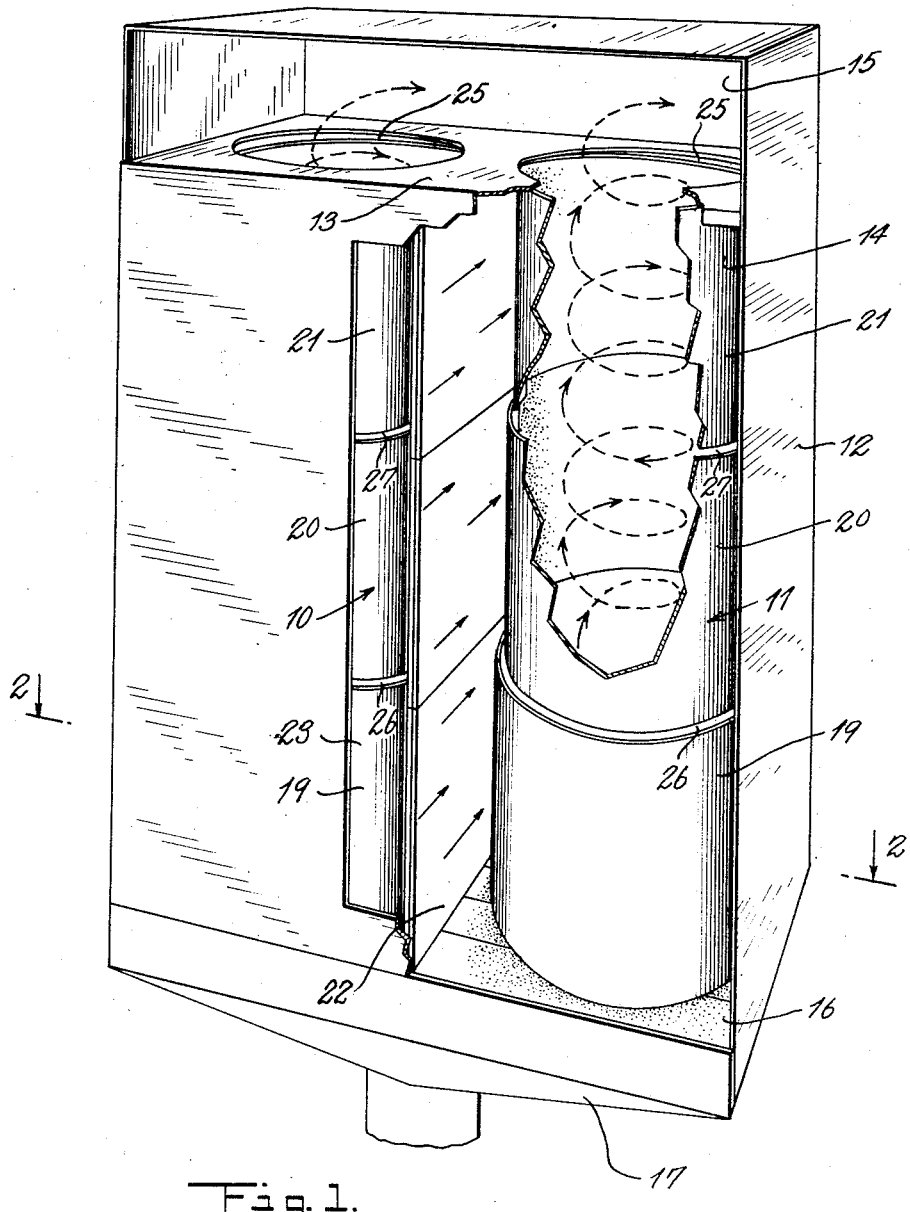
Fig. 1 is a perspective view of a separating apparatus having two separating scrolls, a part of the wall of the apparatus and of one of the scrolls being broken away to show the construction of the apparatus and the path of the gases therein.

Referring more particularly to the apparatus shown in Figs. 1 and 2, a pair of scrolls 10 and 11 are mounted vertically in a chamber 12. The chamber 12 is divided by a horizontal partition 13 immediately above the upper end of the scroll into a plenum chamber 14 and an off-take chamber 15.

At the bottom of the plenum chamber 14 are a number of spaced baffles 16, shown in vertical section in Fig. 5, which separate the plenum chamber 14 from the collecting hopper 17. As shown more in detail in Fig. 5 the baffles 16 are of angle shape in cross-section with their apices uppermost and with their lower edges slightly spaced so as to permit separated particles settling on the baffles to slide downwardly through the spaces 18 at their lower edges into the hopper 17, but of such shape as to prevent eddying of the gases in the hopper.

The scrolls 10 and 11 may rest on and be supported by the upper edges of the baffle 16.

As shown in Fig. 1 each of the scrolls 10 and 11 is made in three sections as at 19, 20 and 21. Each of the scrolls 10 and 11 has a straight length 22 facing toward an inlet opening 23 to the plenum chamber and then curves in a complete circle, the curvature of the two scrolls being in opposite directions. This provides a narrow inlet passage 24 for each scroll through which the air or gas entering the plenum chamber may pass into the scroll and then circulate about the inner surface thereof in a generally upward spiral path, as indicated by the arrows in Fig. 1.

The air or gas may enter freely into the space in the plenum chamber about the scrolls, but as this space is closed or nearly closed from the off-take chamber 15 by a horizontal partition 13, the tendency is for substantially all of the air or gas to enter through the passages 24 and into a circular path in the scrolls before passing into the off-take chamber 15.

During the circulatory movement of the air or gas the particles are thrown toward or against the inner surface of the spiral. Some of the particles may drop directly through the lower open end of the scroll into the collecting hopper 17 while other particles move upwardly with the gas and may then pass out between a space 25 of narrow dimensions between the upper edge of the scroll and the partition 13. A large part of the separated particles will, however, pass through narrow slots 26 between the scroll sections 19 and 20 and slots 27 between the scroll sections 20 and 21.

The suspended particles falling into the relatively quiescent air about the scrolls will settle downwardly between the baffle 16 into the collecting hopper 17. Inasmuch as there is no reversal of the air in passing upwardly past the slots 26, 27, there is no substantial tendency toward eddy formation or other turbulence or disturbance that would tend to carry the separated particles back into the air stream.

A scroll 28 of only one section, as illustrated in Fig. 3, may be used but preferably a scroll of two or more sections is preferred. These sections may be of the same diameter, as shown in the three sections 29, 30, 31 of Fig. 4, or they may be sections 32, 33, 34 of different diameters as shown in Fig. 5. In the latter case the scrolls may be arranged with the successive superposed sections of increasing diameter, as shown in Fig. 5, or reversely with superposed sections of decreasing diameter as shown in the preferred embodiment of Fig. 1.

In Fig. 6, the relationship of the diameters of the scroll sections of Figs. 1 and 2 is shown, the diameter of the lowermost scroll 19 being largest and that of the uppermost section 21 being the smallest, while the diameter of the intermediate section 20 is intermediate that of the top and bottom sections.

The fact that the lower edge of each section is set in from the upper edge of the next lower section does not, however, cause eddying as the general upward direction of the gas spiral is not substantially affected and the separated particles may move freely through the spaces 26 and 27 without disturbing the even flow of the spirally passing gases.

A single scroll of one or more sections may be used or several may be incorporated in a single apparatus. Figs. 1 and 2 illustrate a preferred arrangement of a separator of two scrolls.

Fig. 7 shows one arrangement of four scrolls 35, 36, 37 and 38 in a plenum chamber 39. In this arrangement the scrolls are arranged in a line in two pairs to face two separate inlet openings 40 and 41. The alternative arrangement in Fig. 8 shows four schools 42, 43, 44 and 45 arranged in a plenum chamber 46, all of the inlet ends of the scrolls facing a single inlet opening 47.

In Fig. 9 is shown a group of six scrolls 48, 49, 50, 51, 52 and 53 arranged in two rows of three sections with their inlet entrances facing a common opening 54 in a plenum chamber 55. These are illustrative of various arrangements which may be made to accommodate the separating apparatus to spaces of different dimensions.

The scrolls may be arranged in pairs with opposite curvatures as in Figs. 7 and 8, or partly with the reverse curvatures in adjacent pairs and partly with the curvatures in the same direction as shown in Fig. 9.

If the gases are to be supplied under superatmospheric pressure and may deliver from the scrolls into the atmosphere, the off-take chamber 15 may open directly to the latter or may be omitted.

Through the above invention there is provided a dust or particle separating apparatus which effectively separates certain particles from air or other gases with a minimum of pressure drop or draft loss, and an apparatus of relatively inexpensive and simple construction.

Having described our invention, we claim:

1. Apparatus for separating suspended particles from gases which comprises a sheet bent about a vertical axis to form an enclosure and with its vertical edges spaced and overlapping to form a tangential inlet to said enclosure, said enclosure being open at its upper and lower ends and unobstructed to the free passage of gases from said tangential inlet to said open ends, said sheet having slots transverse to its vertical edges, a dust collecting bin below the lower open end of said enclosure, an off-take chamber above said enclosure and having an opening substantially concentric with the axis of, and of substantially the same cross-sectional area as, said enclosure.

2. Apparatus for separating suspended particles from gases which comprises a sheet bent about a vertical axis to form an enclosure and with its vertical edges spaced and overlapping to form a tangential inlet to said enclosure, said enclosure sheet having slots transverse to the vertical edges of said sheet to divide said enclosure wall into sections, said wall sections being progressively off-set to form sections of different cross-sectional areas, said enclosure being open at its upper and lower ends and unobstructed to the free passage of gases from said tangential inlet to said open ends, a dust collecting bin below the lower open end of said enclosure, an off-take chamber above said enclosure and having an opening substantially concentric with the axis of, and of substantially the same cross-sectional area as, said enclosure.

3. Apparatus for separating suspended particles from gases which comprises a sheet bent about a vertical axis to form an enclosure and with its vertical edges spaced and overlapping to form a tangential inlet to said enclosure, said enclosure being open at its upper and lower ends and unobstructed to the free passage of gases from said tangential inlet to said open ends, a dust collecting bin below the lower open end of said enclosure, an off-take chamber above said enclosure and having an opening substantially concentric with the axis of, and of substantially the same cross-sectional area as, said enclosure, and baffles extending transversely in the upper part of said bin and supporting said enclosure.

4. Apparatus for separating suspended particles from gases which comprises an off-take chamber, a dust collecting bin below and spaced from said off-take chamber, a plenum chamber between said dust bin and said off-take chamber, a centrifugal separating enclosure in said plenum chamber comprising a sheet bent about a vertical axis to form an enclosure and with its vertical edges spaced and overlapping to form a tangential inlet to said enclosure, said enclosure being open at its upper and lower ends and unobstructed to the free passage of gases from said tangential inlet to said open ends, said tangential inlet being within said plenum chamber, the upper end of said dust bin being open and the bottom wall of said off-take chamber having an opening concentric with and of substantially the same cross-section as that of said centrifugal enclosure and baffles extending transversely in the upper part of said bin and supporting said enclosure.

5. Apparatus for separating suspended particles from gases which comprises a sheet bent about a vertical axis to form an enclosure and with its vertical edges spaced and overlapping to form a tangential inlet to said enclosure, said enclosure being open at its upper and lower ends and unobstructed to the free passage of gases from said tangential inlet to said open ends, a dust collecting bin below the lower open end of said enclosure, an off-take chamber above said enclosure and having an opening substantially concentric with the axis of, and of substantially the same cross-sectional area as, said enclosure, and baffles extending transversely of the upper open end of said bin and spaced to form passages between said baffles, said baffles being of angular cross-section with the apex of the angle extending upwardly and a wall of said enclosure being supported on said baffles.

6. Apparatus for separating suspended particles from gases which comprises an off-take chamber, a dust bin spaced below said off-take chamber, a plenum chamber between said off-take chamber and said dust bin, a pair of centrifugal separating enclosures in said plenum chamber, each enclosure comprising a wall having one vertical edge adjacent to a vertical edge of the wall of the other of said enclosures, said enclosures extending in reversed curvature about respective vertical axes for a complete revolution and being drawn inwardly from the opposite edge to form a tangential inlet, said enclosures being open at their ends to said off-take chamber and to said dust chamber and being unobstructed from said vertical edges to said open ends, said dust bin having horizontal baffles supporting said enclosures and spaced to provide downward passages for separating dust from said enclosures.

7. Apparatus for separating suspended particles from gases which comprises an off-take chamber, a dust bin spaced below said off-take chamber, a plenum chamber between said off-take chamber and said dust bin, a pair of centrifugal separating enclosures in said plenum chamber, each enclosure comprising a wall having one vertical edge adjacent to a vertical edge of the wall of the other of said enclosures, said enclosures extending in reversed curvature about respective vertical axes for a complete revolution and being drawn inwardly from the opposite edge to form a tangential inlet, said enclosures being open at their ends to said off-take chamber and to said dust chamber and being unobstructed from said vertical edges to said open ends, said enclosures having horizontal slots to divide said enclosures into superposed sections, the wall of each section being drawn inwardly of the wall of the next lower section to provide sections of decreasing cross-sectional area.

8. Apparatus for separating suspended particles from gases which comprises a sheet bent about a vertical axis to form an enclosure and with its vertical edges spaced and overlapping to form a tangential inlet to said enclosure, said enclosure being open at its upper and lower ends and unobstructed to the free passage of gases from said tangential inlet to said open ends, a dust collecting bin below the lower open end of said enclosure, an off-take chamber above said enclosure and having an opening substantially concentric with the axis of, and of substantially the same cross-sectional area as, said enclosure, and the radius of the curvature of said sheet decreasing progressively from one vertical edge to the opposite vertical edge.

LOUIS C. WHITON.
JOHN E. WATSON.
CHARLES B. McBRIDE.
FRANKLIN REMINGTON.

REFERENCES CITED

The following references are of record in the file of this patent:

UNITED STATES PATENTS

| Number | Name | Date |
|---|---|---|
| 461,801 | Radkey | Oct. 20, 1891 |
| 1,886,548 | Horne et al. | Nov. 8, 1932 |

FOREIGN PATENTS

| Number | Country | Date |
|---|---|---|
| 8,208 | Great Britain | Apr. 13, 1908 |
| 13,034 | Great Britain | June 10, 1903 |
| 22,299 | Great Britain | Oct. 14, 1902 |
| 156,257 | Great Britain | July 21, 1921 |